Patented Nov. 19, 1935

2,021,403

UNITED STATES PATENT OFFICE 2,021,403

SEASONING MEANS OR CONDIMENT

Erich Brust, New York, N. Y.

No Drawing. Application May 18, 1934,
Serial No. 726,295

3 Claims. (Cl. 99—11)

The subject of the invention is a process for manufacturing a condiment for all kind of food-stuff, and a food-stuff, preferably prepared in powdered form according to the manufacturing process of this invention.

A very great number of food-stuff of most different kind, such as for instance salads, meats, soups, sauces, sandwiches, etc., need the addition of seasoning means in order to become more digestible and more tasty. It is a general practice to add the different seasoning means, as for instance salt, pepper, sugar, lemon juice, paprika, and so on, separately one by one to the food-stuff in the course of preparing it, or after it has been cooked or otherwise prepared and has been served to a person. This practice however has some disadvantages, in so far as most people are not sufficient experts in the culinary art to add always the right quantities of the diff ent seasoning means and to add them in the right manner, so as to give the best results for digestiveness and tastiness of the food-stuff. On the other side, if the seasoning of the food-stuff is done already by the cooks in the kitnchen, then certain delicate foodstuffs, such as, for instance, salads, are losing greatly as to their nice appearance in the interval of time, until they are served to the consumer.

In order to overcome these disadvantages in the present manner of preparing food-stuff, I devised a new and improved seasoning means or condiment, in which the before-said ingredients are already combined in such quantities, which the science of food-stuff chemistry has found out to be the most favorable ones. I devised further a working process for preparing my new and improved condiment in a lasting and not perishable form, preferably but not necessarily in powdered form, so that it can be put into shaking casters, to be placed on the table and to be used by the eating person.

The essential constituents of my new and improved condiment are salt, citric acid, paprika, pepper, sugar, but I would not confine myself strictly to the exclusive use of the before-said ingredients nor to the below mentioned quantities of these ingredients.

The working process, by which I combine the beforesaid ingredients into a compound, having the beforesaid characteristic nature and qualities, is as follows:

Citric acid in solid form, and in a quantity amounting to about twenty-two to twenty-five percent of the finished compound, brought into finely granulated or triturated form, and about three times as much table salt, preferably between sixty and seventy percent figured out on the finished compound, are thoroughly mixed at ordinary temperature. Then this mixture is slowly heated whilst being continually stirred. When the boiling point or at least a temperature of not less than 100° C. is reached this temperature is maintained and the stirring is continued for quite some longer time. During this said step of the working process first the condensed water, or moisture which is always present, due to the hygroscopic nature of salt, and which is precipitated on the particles of the salt and mixed between the salt particles, will be evaporated and driven out of the mixture; then the citric acid begins to be melted and replaces the expelled moisture, forming a kind of citric acid atmosphere pervading the whole mixture. By the continued permanent stirring of the mixture always new particles of the salt are so to say insulated within the citric acid atmosphere, out of which atmosphere these particles of the salt, owing to a tendency akin to the hygroscopic nature of the salt, grasp eagerly the material to envelop themselves with a film-like coating of citric acid, which henceforth makes them non-hygroscopic and stable in their seasoning nature, thus forming a quite new and hitherto not yet known interim-product. The stirring is still continued, until it can be observed that all the smallest particles of the granulated or powdered salt are each enveloped into a fine film of the citric acid. Then this product is slowly cooled down to ordinary atmospheric temperature, but the stirring of the mixture during this cooling period must be continued, in order to prevent the coated salt particles from sintering or lumping together. Thereafter into this interim product a small amount of powdered paprika, preferably between two and five percent figured out on the finished compound is poured, whilst stirring the mixture. After that a somewhat smaller quantity of pepper, preferably two or three percent of powdered white pepper is added in the same manner, and finally about the double amount of sugar, preferably between four and eight percent of granulated sugar is added likewise in the same manner. Whereas the mentioned new interim-product, consisting of the acid-coated particles has still a slight tendency towards stickiness, the addition of the powdered paprika, pepper and sugar removes this tendency by insulating these particles from each other, and on the other side the most volatile etheric oils of the paprika and the pepper are bound by the citric acid atmosphere of the aforesaid interim-product.

The before-described manufacturing process can be improved by carrying out, either the whole process or only the first mixture-drying and acid-melting steps of this process, in a partial or complete vacuum, preferably by the use of a so-called autoclave.

I claim:

1. A working process for preparing a non-perishable condiment for different kinds of food-stuff, consisting in a slow-heating of a mixture of citric acid and salt up to the melting temperature of the citric acid, under constant stirring of the mixture; keeping it at such temperature under continued stirring, until all particles of the salt have been enveloped by film-like coatings of citric acid; a subsequent cooling down of this compound to atmospheric temperature whilst still stirring it; and pouring thereafter into it, still under continued stirring, one by one the other ingredients, such as paprika, pepper and sugar in the said sequence.

2. A working process, as claimed in claim 1, carried out under application of a partial vacuum during the process.

3. A non-perishable condiment for different kinds of food-stuff, consisting in a finely distributed mixture of citric acid with salt, in which mixture the hygroscopic nature of the salt is suppressed by having its individual particles coated by crystal-like non-hygroscopic films of the citric acid, and which mixture is compounded with paprika, pepper and sugar, and brought into finely distributed powdered form.

ERICH BRUST.